United States Patent
Alliot et al.

(10) Patent No.: US 10,891,494 B2
(45) Date of Patent: Jan. 12, 2021

(54) DEVICE AND A METHOD FOR DISTINGUISHING BETWEEN A HEAVY GOODS VEHICLE AND A COACH

(71) Applicant: IDEMIA IDENTITY & SECURITY FRANCE, Courbevoie (FR)

(72) Inventors: Samuel Alliot, Courbevoie (FR); Grégoire Carrion, Courbevoie (FR); Eric Guidon, Courbevoie (FR)

(73) Assignee: IDEMIA IDENTITY & SECURITY FRANCE, Courbevoie (FR)

(*) Notice: Subject to any disclaimer, the term of this patent is extended or adjusted under 35 U.S.C. 154(b) by 0 days.

(21) Appl. No.: 16/293,070

(22) Filed: Mar. 5, 2019

(65) Prior Publication Data

US 2019/0278999 A1     Sep. 12, 2019

(30) Foreign Application Priority Data

Mar. 8, 2018    (FR) ...................................... 18 52025

(51) Int. Cl.
*G06K 9/00* (2006.01)
*G01P 3/36* (2006.01)
(Continued)

(52) U.S. Cl.
CPC ............ *G06K 9/00785* (2013.01); *G01P 3/36* (2013.01); *G01P 13/00* (2013.01); *G01V 8/20* (2013.01);
(Continued)

(58) Field of Classification Search
CPC .. G01P 13/00; G01P 3/36; G01V 8/20; G06K 2209/15; G06K 9/00785; G06K 9/3258; G07B 1/00
See application file for complete search history.

(56) References Cited

U.S. PATENT DOCUMENTS

2007/0241933 A1* 10/2007 Price ...................... G01S 7/481
340/904
2014/0037142 A1* 2/2014 Bhanu ................ G06K 9/00785
382/103
(Continued)

FOREIGN PATENT DOCUMENTS

DE    102014210140 A1    12/2014
EP        2130740 A2    12/2009
(Continued)

OTHER PUBLICATIONS

"Side-Fire Lidar-Based Vehicle Classification", Transportation Research Record: Journal of the Transportation Research Board, No. 2308, Transportation Research Board of the National Academies, Washington, D.C., 2012, pp. 173-183.*
(Continued)

*Primary Examiner* — Mohammed S Rahaman
(74) *Attorney, Agent, or Firm* — Muncy, Geissler, Olds and Lowe, P.C.

(57) ABSTRACT

The invention provides a distinguishing device for distinguishing, between vehicles passing in front of the device, a heavy goods vehicle (HGV) from a coach including over its entire length windows between a top side member and a bottom side member, the device comprising:
 a vertical stack of emitters of incident beams towards at least top halves of flanks of at least some of the vehicles;
 a vertical stack of receivers for detecting the beams that are reflected by the flanks of said vehicles;
 calculation means for calculating the time that elapses between each emission of a beam and the detection of the corresponding reflected beam in order to establish an image of each vehicle flank; and
(Continued)

US 10,891,494 B2

Page 2 image processor means for detecting therein the absence or the presence of a top side member.

9 Claims, 2 Drawing Sheets

(51) Int. Cl.
| | |
|---|---|
| *G01P 13/00* | (2006.01) |
| *G01V 8/20* | (2006.01) |
| *G06K 9/32* | (2006.01) |
| *G07B 1/00* | (2006.01) |
| *G08G 1/015* | (2006.01) |
| *G08G 1/054* | (2006.01) |
| *G06K 9/20* | (2006.01) |

(52) U.S. Cl.
CPC ......... *G06K 9/00771* (2013.01); *G06K 9/209* (2013.01); *G06K 9/3258* (2013.01); *G07B 1/00* (2013.01); *G08G 1/015* (2013.01); *G08G 1/054* (2013.01); *G06K 2209/15* (2013.01)

(56) References Cited

U.S. PATENT DOCUMENTS

| | | | |
|---|---|---|---|
| 2015/0046119 A1* | 2/2015 | Sandhawalia | G06K 9/00187 702/167 |
| 2015/0117704 A1* | 4/2015 | Bulan | G06T 7/20 382/103 |

FOREIGN PATENT DOCUMENTS

| | | |
|---|---|---|
| FR | 2404197 A1 | 4/1979 |
| FR | 2706658 A1 | 12/1994 |
| JP | H03180999 A | 8/1991 |

OTHER PUBLICATIONS

"Application of Laser Sensor in Urban Vehicle Type Detection", Liu et al. Technical Gazette 25, 2(2018), 622-626.*
"Intelligent Traffic Monitoring Systems for Vehicle Classification: A Survey" Won et al. Journal of Latex Class Files, vol. 13, No. 9, Sep. 2014.*

* cited by examiner

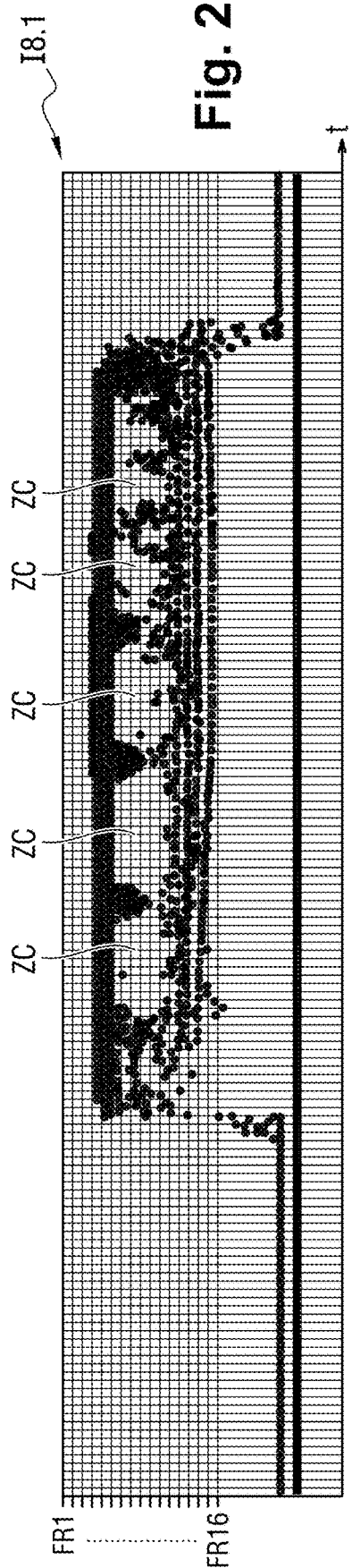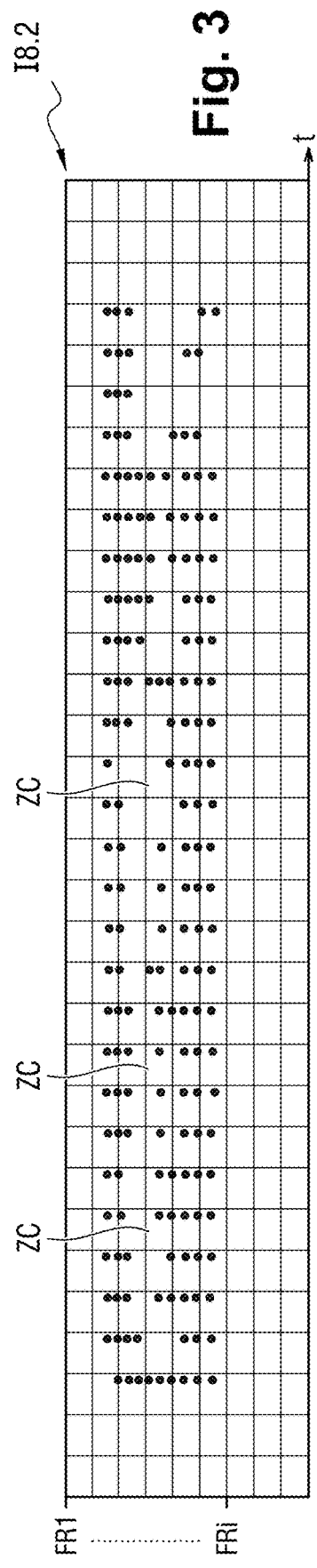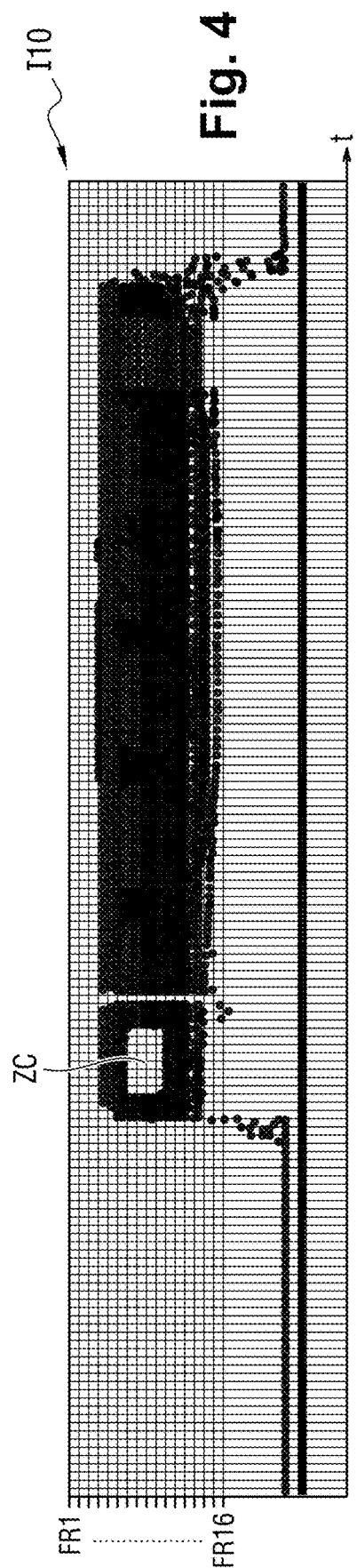

DEVICE AND A METHOD FOR DISTINGUISHING BETWEEN A HEAVY GOODS VEHICLE AND A COACH

The present invention relates to a distinguishing device for distinguishing between heavy duty vehicles, and more particularly for distinguishing between heavy goods vehicles (HGVs) and coaches. The invention also relates to a ticketing device including such a distinguishing device and to a method performed by such a distinguishing device.

BACKGROUND OF THE INVENTION

In order to improve road safety, various automatic radar systems have been installed on the sides of roads in order to measure the speeds of vehicles and in order to photograph vehicles traveling at a speed higher than a determined threshold. The threshold is substantially equal to the maximum speed at which vehicles are allowed to drive.

The maximum allowed speed depends on the type of road (motorways, divided highways, city streets, . . . ) and also on the type of vehicle. Thus, in France, the maximum speed allowed on motorways is 130 kilometers per hour (km/h) for a car, 100 km/h for a coach, and 90 km/h for an HGV.

It is therefore desirable for automatic radars to be capable of identifying the types of vehicle being checked in order to be able to photograph them as a function of their allowed maximum speeds.

Certain automatic radars include a detector antenna serving to estimate the length of the vehicle being checked. That type of radar can thus classify vehicles in two categories, namely light-duty vehicles and heavy-duty vehicles for which the total allowed load is respectively less than or greater than 3.5 (metric) tonnes (t).

Nevertheless, that type of radar cannot distinguish between a coach, which is merely a heavy-duty vehicle for transporting people, and an HGV (i.e. a heavy-duty vehicle for transporting goods). It is therefore necessary to verify the nature of the heavy-duty vehicle that has been photographed, which can be particularly tedious when such verification is performed by a human operator.

Another type of automatic radar includes a telemeter arranged at wheel height in order to derive a signature for the bottom portion of each vehicle being checked. Whereas the signature of a car or of a coach is substantially continuous, the signature of an HGV is on the contrary, very noisy due to the lack of fairing, particularly for the trailer of an HGV.

That type of radar thus makes it possible to distinguish a coach from an HGV, but only on condition that said HGV does not have bodywork in its bottom portion, and that no other vehicle has become interposed between the radar and the vehicle being checked.

OBJECT OF THE INVENTION

An object of the invention is thus to provide means for distinguishing a coach from an HGV in a manner that is simple and reliable, and that obviates the above-mentioned problems, at least in part.

SUMMARY OF THE INVENTION

To this end, the invention proposes a distinguishing device for distinguishing among moving vehicles between a heavy goods vehicle and a coach that includes along its entire length windows between a top side member and a bottom side member. The device comprises:

a vertical stack of emitters of incident beams towards at least top halves of flanks of at least some of the vehicles;

a vertical stack of receivers for detecting the beams that are reflected by the flanks of said vehicles;

calculation means for calculating the time that elapses between each emission of a beam and the detection of the corresponding reflected beam in order to establish an image of each vehicle flank; and image processor means for detecting therein the absence or the presence of a top side member.

Detecting a top side member reveals the presence of windows in the flank of the moving vehicle. Such a device thus makes it possible to distinguish between a heavy goods vehicle having a trailer without any windows and a coach in which windows constitute a major portion of a top half. Such a device may be used in particular for obtaining statistics about the types of vehicles traveling along a portion of road.

In a preferred embodiment of the invention, the incident beams are emitted in the near infrared. In this way, the device is operational by day and by night and without that disturbing vehicle drivers, since infrared beams are not visible to humans.

In particular manner, the incident beams are emitted by laser emitters such as laser diodes.

Advantageously, the incident beams are emitted by LEDs. LEDs constitute infrared beam sources that are less expensive than laser emitters.

In particular manner, the device includes at least one presence or movement detector for identifying the presence of a coach or of an HGV among the vehicles about to pass in front of the device.

Thus, when no coach or HGV is detected in the proximity of the device for a predetermined length of time, it is possible to deactivate the emission of incident beams and/or the reception of reflected beams, and conversely to activate them when a coach or an HGV is about to pass in front of the device. Such a mode of operation makes it possible to limit the energy consumption of the device and to lengthen its lifetime. It also makes it possible to limit the quantity of images to be processed and thus to accelerate image processing.

When the device is connected to a camera, the presence or movement sensor can also make it possible to avoid using said camera too often, in particular while the vehicle being checked is approaching.

In a particular embodiment of the invention, the detector has a substantially horizontal angular detection field extending at a height of substantially 2.5 meters above the road.

As a result, only those moving vehicles that present a height of more than 2.5 meters are detected by the detector, i.e. coaches and HGVs. It is thus possible to avoid taking account of cars passing close to the device when activating and/or deactivating the emission of incident beams and/or the reception of reflected beams, or when controlling any other apparatus connected to said device.

The invention also provides a ticketing device comprising at least one such distinguishing device and a measurement apparatus capable of measuring the speed of a vehicle passing in front of the distinguishing device.

In a preferred embodiment of the invention, the ticketing device includes a camera suitable for photographing the vehicle passing in front of the ticketing device in order to read a number plate of the vehicle in the photograph.

Such a ticketing device is thus capable of taking photographs of HGVs and of coaches at different speeds.

The invention also provides a method of distinguishing among moving vehicles between a heavy goods vehicle and a coach that includes along its entire length windows between a top side member and a bottom side member. The method comprises the following steps:

- emitting incident beams along a vertical line towards at least top halves of flanks of at least some of the vehicles;
- picking up along a vertical line the beams that are reflected by the flank of a said vehicle;
- determining the time that elapses between each emission of a beam and detecting the corresponding reflected beam in order to establish an image of each vehicle flank; and
- in the image, detecting the absence or presence of a top side member.

Other characteristics and advantages of the invention appear on reading the following description of a particular, non-limiting embodiment of the invention.

BRIEF DESCRIPTION OF THE FIGURES

Reference is made to the accompanying figures, in which:

FIG. 2 shows a first image representing a coach traveling at a first speed past the device shown in FIG. 1;

FIG. 3 shows a second image, at lower definition, representing a coach traveling at a second speed past the device shown in FIG. 1; and FIG. 4 shows an image of an HGV traveling past the device shown in FIG. 1.

DETAILED DESCRIPTION OF THE INVENTION

Figure 1:
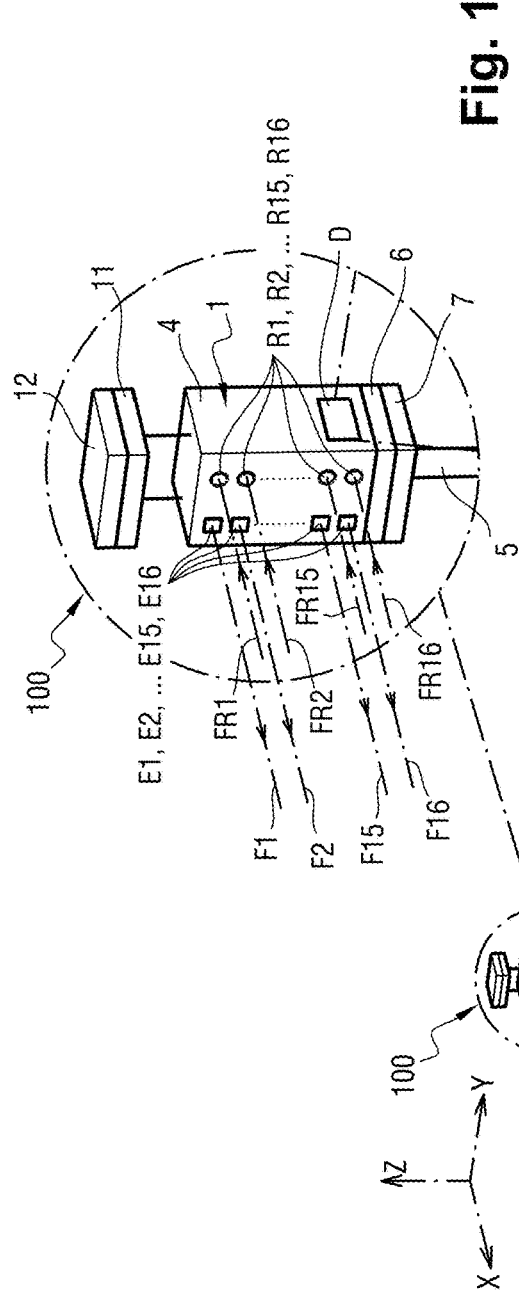
FIG. 1 shows a distinguishing device in a particular embodiment of the invention.
Figure 1:
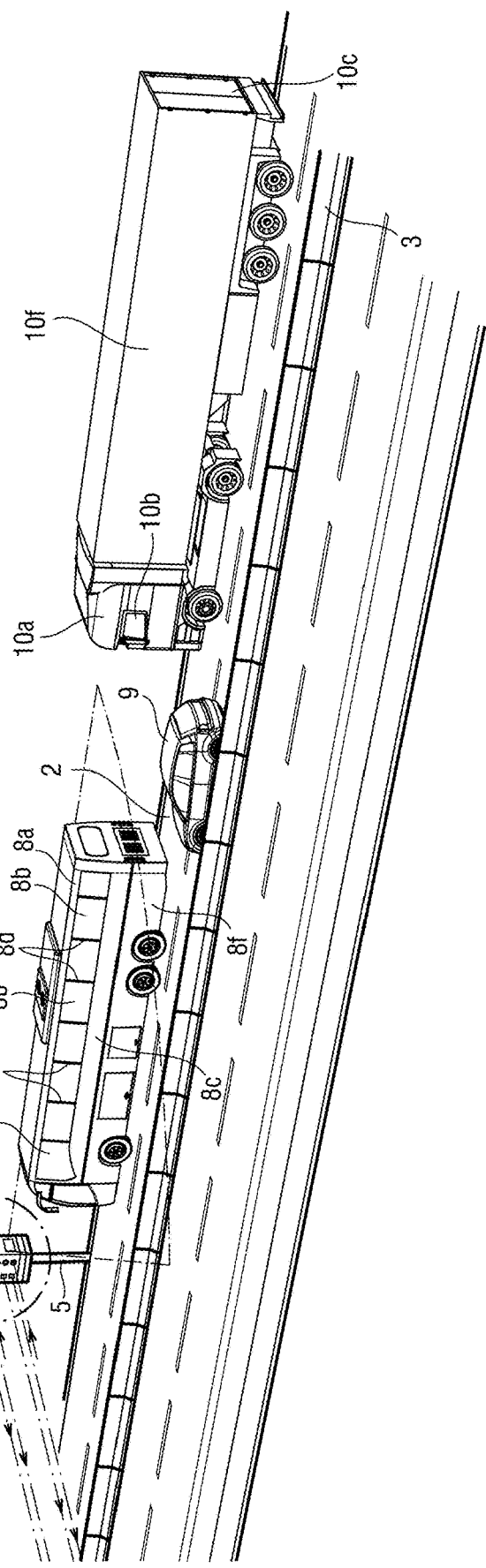

With reference to FIG. 1, a distinguishing device 1 in a particular embodiment of the invention is installed at the side of a road 2 that extends horizontally along an axis Y. The road 2 is straight with four lanes separated in pairs by a central reservation 3.

The device 1 comprises a box 4 mounted at the top end of a post 5 extending vertically along an axis Z. The box 4 has a vertical stack of sixteen emitters Ei (E1, E2, . . . , E16) for emitting infrared incident beams Fi (F1, F2, . . . , F16). For reasons of legibility, only the first two emitters E1 and E2, and the last two emitters E15 and E16 are shown together with the corresponding incident beams F1, F2, F15, and F16. In this example, the incident infrared beams Fi are emitted by light-emitting diodes (LEDs), however they could also be emitted by laser emitters or by any other source of infrared light pulses.

The incident beams Fi are uniformly distributed between the beam F1 and the beam F16, which are respectively substantially at a height of two meters and at a height of four meters above the road 2. The emitters E1 point the incident beams Fi along paths along an axis X perpendicular to the axis Y of the road 2 so as to form a vertical light barrier 5 extending across the road so that the flank of each vehicle going through the barrier is scanned by the incident beams Fi along the entire length of the vehicle and over a height of the vehicle lying in the range two meters to four meters. When there is no obstacle in front of the device 1, the incident beams Fi cross all four lanes of the road 2, given that the central reservation 3 is of a height that is much less than two meters.

The box 4 also has a vertical stack of sixteen receivers Ri (R1, R2, . . . , R16) for receiving reflected beams FRi (FR1, FR2, . . . , FR16). The respective receivers Ri are juxtaposed with the corresponding emitters Ei. For the same reasons as above, only the first two receivers R1 and R2, and the last two receivers R15 and R16 are shown together with the corresponding reflected beams FR1, FR2, FR15, and FR16.

The device 1 also has calculation means 6 for calculating the travel time of each beam coming from the emitters Ei, i.e. the time that elapses between each incident beam Fi being emitted and the corresponding reflected beam FRi being detected. In this example, the calculation means 6 are arranged inside the box 4 and serve to detect the presence of an obstacle in front of at least one of the emitters Ei and to establish an image I of said obstacle progressively as it goes past the device 1. Processor means 7 connected to the calculation means 6 serve to analyze the composition of the image I. In this example, the calculation means 6 and the processor means 7 are computer programs executed by a computer unit that is housed inside the box 4 and that comprises: a memory storing the programs, settings data for the programs, and acquired data; a processor executing the programs and controlling the operation of the device; and means for connection to a network so as to enable the computer unit to transmit to a remote central server both the images and also the measured data corresponding to offences that are detected.

In FIG. 1, a coach 8 of height significantly less than four meters is travelling on one side of the central reservation 5 and is about to go past the device 1. The coach 8 has windows 8b on both sides occupying a top half of the flanks 8f of the coach. The windows 8b lie between a top side member 8a and a bottom side member 8c, and they are separated by vertical uprights 8d.

Also travelling on the road is a car 9 of height that never exceeds two meters, and an HGV 10 of height that is substantially less than four meters. The HGV 10 comprises a tractor 10a coupled to a trailer 10c completely covered in metal sheet. Like the coach 8, both the car 9 and the HGV 10 are about to go past the device 1.

When, at an instant t, a portion of the coach 8 is in front of the device 1, each incident beam Fi reaching the top side member 8a, the bottom side member 8c, or the uprights 8d is reflected and returned to the corresponding receiver Ri. Conversely, the majority of each incident beam Fi that encounters a window 8b passes through it. The remainder is reflected and presents an intensity that is well below that of the incident beams passing through the window 8b. The corresponding receivers Ri thus detect the reflected portions of the incident beams, but they make use of a predetermined threshold so as to ignore them.

Since the distances between the coach 8 and each emitter Ei or receiver Ri are substantially identical, the incident beams Fi that are reflected by the flanks 8f of the coach 8 thus present travel times that are substantially identical.

By determining, at the instant t, which ones of incident beams Fi present substantially identical travel times, the calculation means 6 establish a run of vertically aligned points representing a portion of the flank 8f of the coach 8 that is located in front of the device 1 at the instant t.

Thus, as the coach 8 moves past the device 1 at a speed V1, the calculation means 6 establish, as shown in FIG. 2, an image I8.1 of the top half of the flank 8f of the coach 8.

The image I8.1 has hollow zones ZC corresponding to the windows 8b of the coach 8, and solid zones corresponding to the portions without windows, in other words corresponding to the top side member 8*a*, to the bottom side member 8*c*, and to the uprights 8*d*.

In the image I8.1, the processor means 7 have no difficulty in detecting the presence of at least one line of points above the hollow zones, thereby revealing the presence of the top side member 8*a* of the coach 8.

Conversely, when the HGV 10 goes past the device 1, the incident beams Fi are reflected for the most part on the sheet metal forming the flank 10*f* of the HGV 10. As above, and as the HGV 10 goes past the device 1, the calculation means 6 establishes an image I10 of the top half of the flank 10*f* of the HGV 10 (FIG. 4).

Unlike the images I8.1, the image I10 has a single hollow zone ZC corresponding to a window 10*b* of the tractor 10*a*, followed by a solid zone ZP corresponding to a top half of the trailer 10*c* covered in metal sheet. The absence of hollow zones over the major portion of the image I10 reveals the absence of windows. It is therefore not possible in this image to detect a top side member.

Detecting the presence or the absence of a top side member in the images I8.1 and I10 thus makes it possible to distinguish between the coach 8 and the HGV 10 without having recourse to major calculation means and image processing means.

It should be observed that the images I8.1 and I10 make it possible to evaluate the height of the coach 8 and the height of the HGV 10.

It may also be observed that calculating the travel time of the beams coming from the emitters Ei makes it possible not only to determine a position for the flank of the vehicle being scanned, but also to determine easily the lane in which the vehicle is travelling.

It should also be observed that it is possible to use some other number of emitters and/or receivers. FIG. 3 shows in similar manner to FIG. 2, an image I8.2 of the flank 8*f* of a coach 8 going past the device 1 at a speed V2 faster than the speed V1. Thus, the horizontal definition of the image I8.2 is greater than that of the image I8.1. In this example, the vertical definition of the image I8.2 is less than that of the image I8.1 since a smaller number of emitters and receivers are used. Nevertheless, this does not prevent hollow zones ZC from being observed. As before, the processor means 7 have no difficulty in detecting the presence of at least one line of points above the hollow zones ZC, and thus the presence of a top side member 8*a* of the coach 8.

Nevertheless, the number of emitters and receivers must be not less than two. A first emitter is then arranged to emit at least one incident beam reaching the top side member 8*a* of the coach 8, while a second emitter is arranged so as to emit at least one beam that meets the windows 8*b* of the coach 8.

According to an advantageous characteristic of the invention, the device 1 has a presence detector D arranged on a side face of the box 4 in order to detect tall vehicles that are about to go in front of the device 1. The detector D is arranged at a height of substantially 2.5 meters above the road 2 and has a substantially horizontal angular detection field covering the monitored lanes of the road 2.

Thus, when no coach or HGV is detected by the detector D during a defined length of time, it is possible for example to deactivate the emission of the incident beams Fi and/or the reception of reflected beams FRi. Conversely, if a coach or an HGV is detected by the detector D, the emission of incident beams Fi and the reception of reflected beams FRi can be activated before the coach or the HGV passes in front of the device 1.

The detector D thus makes it possible to limit the energy consumption of the device 1 and to extend its lifetime. Furthermore, it limits the quantity of images that need to be processed, thereby serving to accelerate processing.

When the device is connected to a camera, the presence or movement sensor may also serve to avoid said camera being triggered too often, in particular while the vehicle being checked is approaching.

According to another advantageous characteristic of the invention, the distinguishing device 1 is integrated with a ticketing device 100 that includes a measurement appliance 11 capable of measuring the speed of a vehicle passing in front of the device and a camera 12 capable of photographing said vehicle in such a manner as to be able to identify its number plate.

By virtue of the device 1, the ticketing device 100 is capable of distinguishing the coach 8 from the HGV 10 and thus of photographing them as a function of respective first and second speed thresholds. When no coach or HGV is detected by the detector D of the device 1, and when the measurement appliance 11 measures the speed of a vehicle, the device 100 can deduce that said vehicle is a car and can then photograph it as a function of a third speed threshold.

It should be observed that the images I8.1, I8.2, and I10 combined with the speeds measured by the measurement appliance 11 make it simple to evaluate the length of the coach 8 and of the HGV 10.

Naturally, the invention is not limited to the embodiments described, but covers any variant coming within the ambit of the invention as defined by the claims.

Although the emitters Ei and the receivers Ri in this example are stacked so as to cover only top halves of the flanks of the coach 8 or of the HGV 10, the incident beams Fi could equally well be emitted over the full height of the coach 8 or of the HGV 10.

The device 1 of the invention may be adapted for use along any type of road, e.g. a road having two, four, six, or eight lanes that may be separated by a central reservation, by a low wall, by a safety barrier, or merely by marking on the road.

The device 1 of the invention may include a second presence detector so as to be able to detect tall vehicles travelling on the side of the central reservation 3 that is opposite from the side on which the vehicles 8, 9, and 10 are travelling, and that are about to pass in front of the device 1. As a result, it is possible to detect vehicles approaching the device 1 in both travel directions, in particular for the purpose of activating and deactivating the emission of the incident beams.

The invention claimed is:

1. A distinguishing device for distinguishing, between vehicles passing in front of the device, any heavy goods vehicle (HGV) from a coach including over at least a major portion of its length windows between a top side member and a bottom side member, the device being arranged to be placed at the side of a road and comprising:

a vertical stack of emitters of incident beams towards at least top halves of flanks of at least some of the vehicles; and a vertical stack of receivers for detecting the beams that are reflected by the flanks of said vehicles;

a processor and memory implementing a calculation unit and an image processing unit, wherein the calculation unit calculates the time that elapses between each emission of a beam and the detection of the corresponding reflected beam in order to establish an image of each vehicle flank; and the image processing unit detects in the image the absence or the presence of a top side member revealing the absence or the presence of windows over at least a major portion of the length of the vehicle.

2. A device according to claim 1, wherein the incident beams are emitted in the near infrared.

3. A device according to claim 2, wherein the incident beams are emitted by laser emitters such as laser diodes.

4. A device according to claim 2, wherein the incident beams are emitted by LEDs.

5. A device according to claim 1, including at least one presence or movement detector for identifying the presence of a coach or of an HGV among the vehicles about to pass in front of the device.

6. A device according to claim 5, wherein the detector has a substantially horizontal angular detection field extending at a height of substantially 2.5 meters above the road.

7. A ticketing device including at least one distinguishing device according to claim 1 together with measurement apparatus capable of measuring the speed of a vehicle passing in front of the distinguishing device.

8. A ticketing device according to claim 7, including a camera for taking a picture of the vehicle passing in front of the ticketing device in order to read a number plate of the vehicle in the photograph.

9. A method of distinguishing among moving vehicles between any heavy goods vehicle and a coach that includes along its entire length windows between a top side member and a bottom side member, the method comprising the following steps:
   emitting incident beams along a vertical line towards at least top halves of flanks of at least some of the vehicles;
   picking up along a vertical line the beams that are reflected by the flank of a said vehicle;
   determining the time that elapses between each emission of a beam and detecting the corresponding reflected beam in order to establish an image of each vehicle flank; and
   in the image, detecting the absence or presence of a top side member revealing the absence or the presence of windows over at least a major portion of the length of the vehicle.

* * * * *